United States Patent [19]

Perry

[11] Patent Number: 4,747,324
[45] Date of Patent: May 31, 1988

[54] ROLLER DRIVE ASSEMBLIES

[76] Inventor: Forbes G. D. Perry, Long Meadow, Church St., Charlbury, Oxford, Great Britain, 0X7 3PD

[21] Appl. No.: 1,232

[22] Filed: Jan. 7, 1987

[30] Foreign Application Priority Data

Jan. 8, 1986 [GB] United Kingdom ............ 8600331
Feb. 27, 1986 [GB] United Kingdom ............ 8604822

[51] Int. Cl.⁴ .................. F16H 15/16; F16H 13/06
[52] U.S. Cl. ................................ 74/798; 74/690; 74/191; 74/193
[58] Field of Search ............ 74/798, 206, 191, 193, 74/762, 801, 763, 202, 690; 403/31

[56] References Cited

U.S. PATENT DOCUMENTS

| | | | |
|---|---|---|---|
| 1,017,911 | 2/1912 | Rennerfelt | 74/798 |
| 1,056,292 | 3/1913 | Nettenstrom | 74/690 |
| 1,194,107 | 8/1916 | Whiteside | 74/690 |
| 1,399,443 | 12/1921 | Rennerfelt | 74/798 |
| 1,993,051 | 3/1935 | Dell et al. | 74/798 |
| 2,216,190 | 10/1940 | Erban | 74/690 |
| 2,306,475 | 12/1942 | Wahl | 74/798 |
| 2,353,136 | 7/1944 | Bade | 74/690 |
| 2,480,968 | 9/1949 | Ronai | 74/193 |
| 2,694,470 | 11/1954 | Gendron | 74/762 |
| 3,048,058 | 8/1962 | Chery | 74/798 |
| 3,207,004 | 9/1965 | Chery | 74/798 |
| 3,375,739 | 4/1968 | Nasvytis | 74/798 |
| 4,007,648 | 2/1977 | Bookout | 74/763 |
| 4,192,201 | 3/1980 | McCoin | 74/191 |
| 4,296,647 | 10/1981 | Kemper | 74/191 |
| 4,576,055 | 3/1986 | Kraus | 74/200 |

Primary Examiner—Dirk Wright
Attorney, Agent, or Firm—Fitch, Even, Tabin & Flannery

[57] ABSTRACT

A roller drive system comprises two coaxial bevelled central rollers (32,32a) each coupled to a bevelled annulus (37) by way of a respective set of bevelled rollers (34,34a) each engaging the respective central roller and the annulus. The generatrices of the engagement surfaces of the rollers in each set and the annulus intersect at a respective common point on the axis of the central rollers. Hydraulic conduits (47,49,54) are provided for communicating hydraulic pressure in common to each roller to urge each roller axially into engagement with the surfaces of the central roller and the annulus.

17 Claims, 2 Drawing Sheets

ROLLER DRIVE ASSEMBLIES

The present invention relates to roller drive assemblies.

It is known to provide a mechanical drive by oil film traction between rolling components either for variable speed or for fixed ratios. The object of the present invention is to provide a drive layout which may provide, for example, a speed increase or reduction of between 3 to 1 and 6 to 1 with a high efficiency and power density. The invention is primarily intended to be suitable for use at high speeds, such as ten to twelve thousand r.p.m.

According to one aspect of the invention, there is provided a roller drive assembly in which a first central bevelled roller is coupled to a bevelled annulus coaxial with the central roller by way of a set of bevelled rollers each engaging the central roller and the annulus, the generatrices of the engagement surfaces of the rollers and the ring intersecting in a common point on the axis of the central roller; a second central roller is coaxial with and spaced axially from the first, the second central roller being coupled to a respective bevelled drive ring, which may be integral with the first, of the annulus by means of a respective second set of rollers, the second central roller being coupled to a common member with the first central roller, the bevelling of the second central roller and the respective set of rollers being in a sense opposite to that of the bevelling of the first central roller and its respective set of rollers.

The said set of rollers may comprise rollers supported at evenly spaced locations about the central roller by a fixed reaction member.

The two central rollers may be urged in mutually opposite directions, into contact with their respective said set of rollers, by means which are self-contained within the assembly, so that there is no, or no substantial axial load taken by a casing or other part which is either stationary or moves at a slow speed relative to the rotating assembly.

The drive system as characterised in the foregoing has a rolling geometry on a true bevel layout, there being no spin at the rolling contacts; the rollers in the set or sets work in parallel between a central roller and a single annulus and it is thereby possible to minimise the axial length and overall diameter of the drive system. Moreover the system is substantially axially balanced and does not require in normal operation thrust bearings, which are unsuitable for use in high speed systems.

A further development of the present invention consists of the combination of a roller drive system as described above with at least one epicyclic gear train. In practice the limit for quiet gear operation is at about 3000 r.p.m. and a roller drive system as described in the foregoing is adequate to reduce shaft speeds from, for example, of the order of 1200 r.p.m. down to below the upper limit for quiet gear operation. A higher reduction ratio involves greater torque and thus the end load, and hence size for a given life, of a roller drive begins to become excessive. Epicyclic gearing can take the increased torque efficiently in terms of power and volume and also comparatively quietly. Thus to obtain a torque multiplication ratio substantially greater than that conveniently available from the roller drive system as described in the foregoing, the said annulus may be connected to or constitute a first member of an epicyclic gear system of which a second member constitutes a reaction member and a third member constitutes an output member. For example, the said annulus may carry an annular gear in mesh with at least one and preferably a set of planet gears which are mounted on an output shaft member and the planets may be in mesh with a sun gear constituting the reaction member. A further stage of speed reduction may be provided by an additional epicyclic stage following or compounded with the said epicyclic gear system.

Another aspect of the present invention is concerned with the hydraulic positioning of rollers in a set of rollers which work between relatively rotatable members and more particularly to the equalisation of axial end loads of the rollers in such a set.

In a set of rollers which provide for the transmission of torque between relatively rotatable members, such as a sun and an annulus, the axial end load of the whole rolling assembly should be shared substantially equally between the rollers so that they may each provide their share of transmitted torque. Where there are two or three rollers per set, the arrangement is potentially load equalising, but where there are four or more rollers per set the torque can be equalised only by means of deflections of the engagement surfaces or the supports.

Broadly speaking, according to this aspect of the present invention the conical shape of roller engagement faces is exploited to equalise axial loads by means of hydraulic pressure acting on each roller, preferably employing a common stationary reaction member which is torsionally fixed to a casing for the assembly. In particular, a roller drive assembly may include a set of angularly spaced tapered rollers for the transmission of torque between relatively rotatable members having mutually inclined engagement surfaces each engageable by all the rollers in the set and means for communicating hydraulic pressure in common to each roller to urge the rollers into engagement with the said surfaces.

Preferably, the means for communicating hydraulic pressure comprises, for each roller, an annular cylinder having as one wall a portion of the respective roller. Thus if each roller has the same pressure in its cylinder, which is preferably similarly sized for all the rollers, the axial forces will be the same for all the rollers and the radial loading on which torque sharing depends will also be the same. Accordingly, all the rollers in a set are preferably fed by hydraulic pressure which may be supplied by way of a transfer through roller reaction pins on a stationary reaction member. This pressure may be provided by a fixed displacement pump. Where there are two sets of rollers, for example each set engaging a respective central bevelled roller and a respective bevelled surface on an annulus which is common to the two sets, the bevelling being in opposite senses, the pressure to each set of rollers may be the same but largely independent of the other, for example by means of an orifice feed to each set of rollers from a relatively high pressure source.

Preferably, for each roller, there is a thrust bearing for supporting the respective roller against axial loading in the absence of the said hydraulic pressure. Such thrust bearings will support the rollers at zero rotary speed of the assembly by in normal operation the rollers will be adjusted to an axial position where the load on the roller is taken wholly hydraulically and the thrust bearings will be unloaded.

The axial positioning of the rollers may be controlled by a pressure release port openable by means of predetermined axial movement of one roller in a set. Provided that the arrangement is such that all the rollers take the same pressure, they will lead to assume positions where their axial loads are equal.

DETAILED DESCRIPTION

Figure 1:
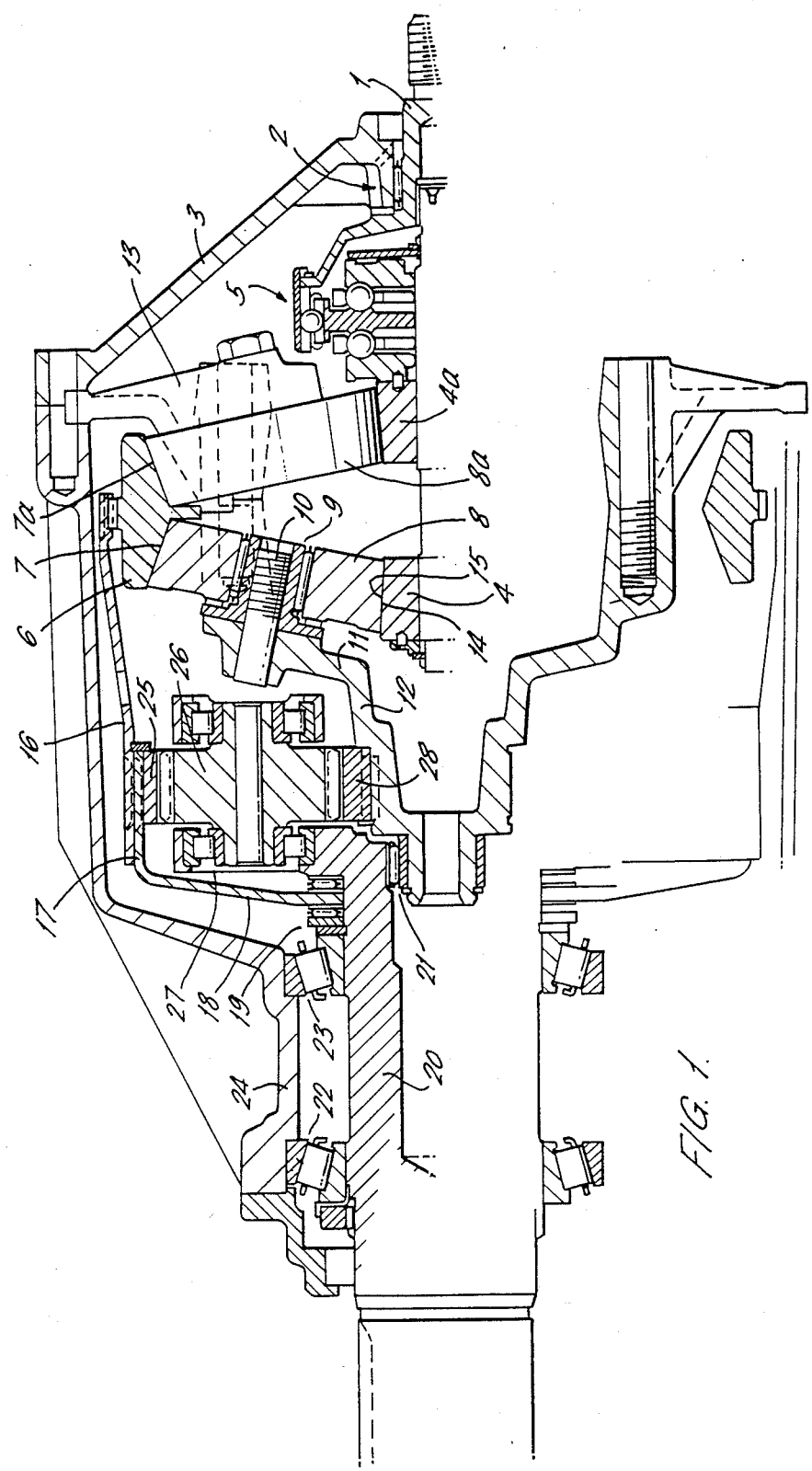
FIG. 1 is a part-sectional view of one embodiment of the invention.

The embodiment shown in FIG. 1 illustrates the incorporation in a single drive system of a roller drive which provides a first stage of speed reduction and an epicyclic gear stage driven from the output member of the roller drive.

The input to the roller drive system is in this embodiment constituted by an input shaft 1 which is supported by a bearing 2 relative to an end frame 3. The shaft 1 carries two spaced apart coaxial central rollers 4 and 4a, which are bevelled or tapered in opposite directions. The rollers 4 and 4a are loaded in opposite directions by means of a known form of load sharing mechanism 5.

The output member of the roller drive is an annulus 6 which in this embodiment has two bevelled ring surfaces 7 and 7a.

The roller 4 drives the ring 7 through a set, in this example three bevelled rollers 8 of which each is mounted by means of a bearing 9 on a stub shaft 10 extending from a respective arm 11 of a fixed spider 12. The roller 4a drives the ring 7a via a set, likewise in this example three bevelled rollers 8a which are each mounted on an extension arm 13 secured to the frame 3 which is also secured to the spider 12. The generatrices of the bevelled contact surface 14 of the rollers 4, contact surface 15 of the rollers 8 and the engagement surface of ring 7 intersect at a common point lying on the common axis of the input shaft 1 and the output annulus 6. The corresponding generatrices of the engagement surfaces of the rollers 4a, rollers 8a and ring 7a lie on a respective common point on the axis of roller 4a. Moreover, the input shaft in effect drives the output member 6 by way of a plurality, i.e. six rollers working in parallel. This arrangement promotes the achievement of a high power density and excellent drive efficiency. It should be noted that there is true rolling and no spin at the rolling contacts. The centres of the intermediate rollers 8 and 8a are held against rotation about the axis of the input shaft. Since the rollers 4 and 4a are urged in opposite directions, in this embodiment towards each other, the roller drive system is self aligning.

In this embodiment of the invention all thrust loads are generated and reacted within the input shaft assembly and the only bearing running at high speed is the input shaft's needle race, which has negligible loading.

If a step-up in speed is required, the shaft 1 would be the output member and the annulus 6 the input member.

The annulus 6 could be directly coupled to a final output drive member but in this embodiment of the invention in order to provide an additional stage of speed reduction the roller drive system is followed by an epicyclic gear stage. For this purpose the annulus 6 is mounted in a sleeve 16 which is secured to an annular sleeve 17 extending peripherally from a disc 18 mounted for rotation under thrust loads from the planet tooth contacts by means of a bearing 19 with respect to an output shaft 20 which is supported by bearings 23 and 22 with respect to the casing 24. The boss of the spider 12 is held concentric by bearing 21.

The sleeve 17 carries an internally toothed ring 25 which is in mesh with a plurality of planet gears 26 supported in a planet carrier 27 secured to the shaft 20. The planets are in mesh with a sun gear 28 secured to the spider 12.

Figure 2:
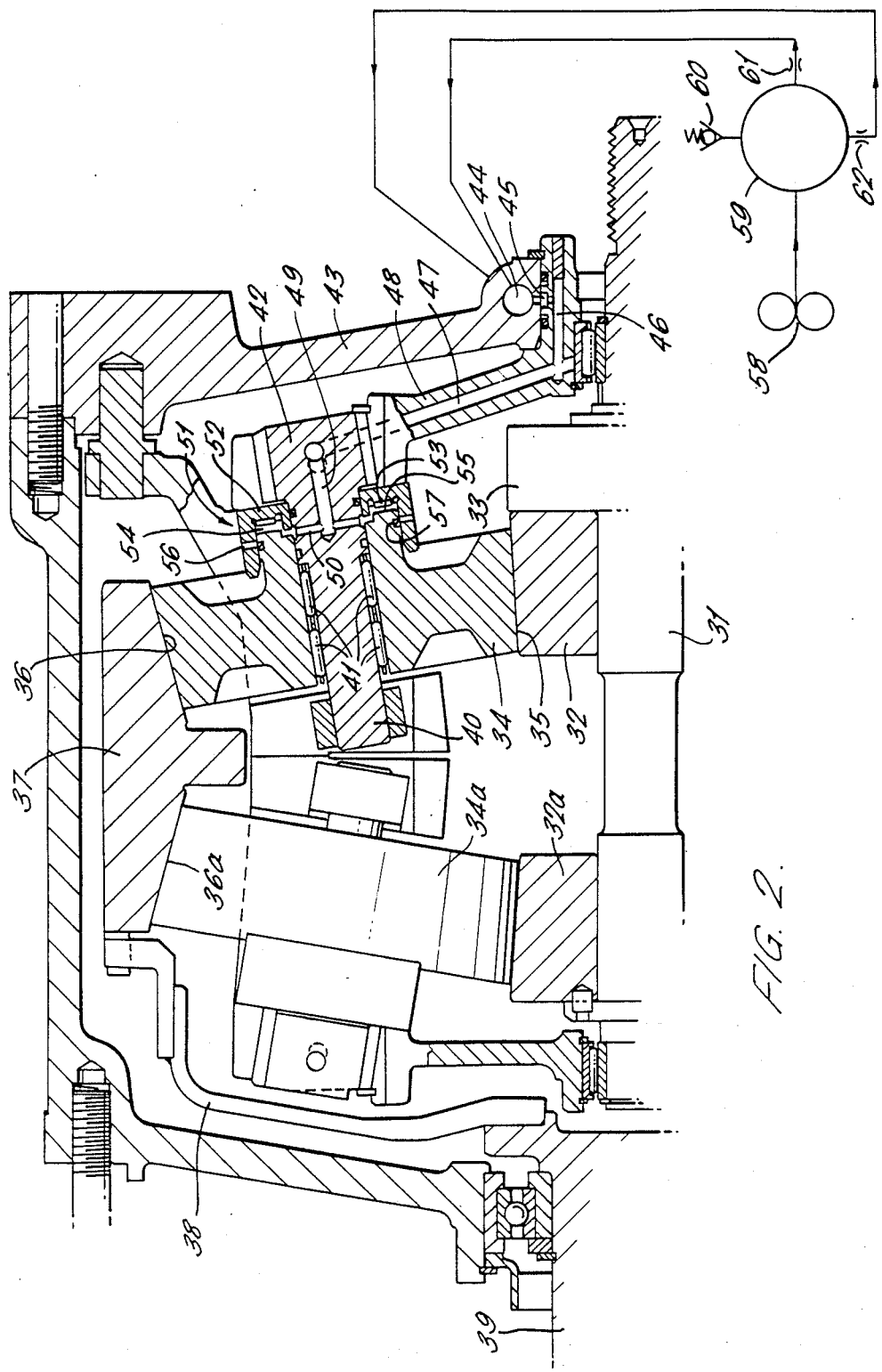
FIG. 2 is a part-sectional view of another embodiment of the invention.

In the assembly shown in FIG. 2, a shaft 31 carries a sun roller 32. Mechanical end load on the sun 32 is provided by torque sensitive means 33. In frictional engagement with the sun 32 are all the rollers 34 in a set of rollers, of which only one is shown, spaced apart angularly around the sun 32. Each of the rollers 34 is bevelled and engages the bevelled surface 36 of an annulus 37 which is fixed to an end disc 38 mounted for rotation with a shaft 39 coaxial with the shaft 31. One each of the shafts 31 and 39 constitutes an input and output shaft respectively. In these respects the assembly shown in FIG. 2 resembles the assembly shown in FIG. 1.

In this embodiment of the invention there is a second sun 32a and a second set of bevelled rollers 34a providing the transmission of torque between the sun and a second engagement surface 36a on the annulus 37, the bevelling of the second set of rollers being in a sense opposite to that of the bevelling of the first set. As will become apparent, the axial urging of the two sets of rollers should be in mutually opposite directions but for the sake of simplicity only the hydraulic arrangements for the first set of rollers will be described in detail.

Each roller 34 is mounted on and axially movable relative to a respective reaction pin 40, needle bearings 41 being disposed between the inner periphery of the roller 34 and the pin 40. The pins 40 are located tangentially but not radially in a fixed reaction member 42 which is torsionally fixed to casing member 43. Within the casing member 43 is a passageway 44 adapted to receive hydraulic pressure from a source to be described. The passageway 44 communicates by way of a transfer 45 with a passage 46 in the reaction member 42, the passage 46 communicating by means of a bore 47 in the leg 48 of the reaction member to an axially directed passageway 49 in the reaction pin. At the end of passageway 49 are bores 50 leading to an annular hydraulic pressure pad 51 which is in the form of an annular cylinder 52 which at one end has needle thrust bearings 53. Protruding into the cylinder is an annular end portion 55 attached to and rotating with the roller 54 and in this example an integral part of it. The inner wall of the cylinder 52 is comparatively short and allows hydraulic pressure from the bores 50 to enter the space 54 defined within the cylinder. The outer wall of the cylinder is comparatively long and includes a relief port 56 which is uncovered when the roller 34 moves axially, relative to the cylinder 52, sufficient to move a piston ring seal 57 beyond the location of the port 56.

A fixed displacement pump 58, driven by the assembly, feeds a distributor 59 which has a pressure relief valve 60, shown schematically. From the distributor hydraulic pressure is conveyed by way of orifice 61 by means not shown to the passage 44 and thence to the cylinders for the rollers in the first set and also, separately, by way of orifice 62 to similar cylinders for the rollers in the second set. Provision of the orifices 61 and 62 prevents widely unequal pressures in the two pressure feed lines to the rollers.

In the absence of hydraulic pressure, as when the drive assembly is stationary, the roller 34 is forced back on to the needle thrust bearings 53. However, although torque may have to be transmitted at zero speed and, in the present embodiment, with zero hydraulic pressure, the duration of torque transmitting periods with the roller 34 in contact with the needle thrust bearings would be very short and the provision of reasonably small bearings is feasible for an adequate fatigue life.

In normal operation, the hydraulic pressure which is communicated in common to the cylinders for all the rollers in a set, forces each roller axially into engagement with the engagement surfaces 35 and 36 and the axial end load on the roller 34 is taken wholly hydraulically, the end face 55 of the roller being lifted off the thrust bearings 53, which are thereby unloaded.

In order to ensure equalisation of the axial loads on the rollers in the set, one of the rollers 34 has a cylinder 52 having the relief port 56, which is preferably omitted in respect of the other rollers. Thus the other rollers take the same pressure as the "positioning" roller and all have equal axial loads.

In the present embodiment, piston ring type rotary seals are employed for the roller 34 but other types of seal are possible.

What is claimed is:

1. A roller drive assembly comprising: a first bevelled central roller; a bevelled annulus coaxial with the central roller; a set of bevelled rollers each engaging the central roller and the annulus, the generatrices of the engagement surfaces of the rollers and the respective engagement surface of the annulus intersecting at a common point on the axis of the central roller; a second bevelled central roller; a rotary member common to the first and second central rollers; a second set of rollers, the second central roller being coupled to a respective bevelled drive surface of the annulus by means of the second set of rollers, the generatrices of the engagement surfaces of the second central roller and the rollers of the second set intersecting at a second point on said common axis, the bevelling of the respective sets of rollers being in opposite directions; and a fixed reaction member supporting the rollers in each respective set of rollers at evenly spaced locations about the respective central roller.

2. A roller drive assembly according to claim 1, in combination with an epicyclic gear stage comprising one member which is connected to the said annulus, a second member which constitutes a reaction member and a third member which constitutes an output member for the epicyclic gear stage.

3. A roller drive assembly according to claim 2 wherein the said one member is a geared ring, and the output member comprises a set of planet gears meshing with the ring and mounted by means of a carrier for rotation with an output shaft, the latter reaction member comprising a sun gear in mesh with the said planet gears.

4. A roller drive assembly according to claim 1, further comprising means, including respective fluid passageways in the respective reaction member, for communicating hydraulic pressure in common to each roller in each set to urge the rollers in each set in respective axial directions into engagement with the respective engagement surfaces of the central roller and the annulus.

5. An assembly according to claim 4, further comprising thrust bearing means for supporting each roller in said respective set against axial loading in the absence of the said pressure.

6. An assembly according to claim 4 in which the means for communicating hydraulic pressure comprises, for each roller in said respective set, an annular cylinder having movable as a piston therein a portion of the respective roller.

7. An assembly according to claim 6 in which the cylinder for one roller in said respective set includes means for limiting the axial movement caused by the said hydraulic pressure.

8. An assembly according to claim 7 in which the means for limiting comprises a pressure relief port openable by means of a predetermined movement of the said portion of the said one roller.

9. A roller drive assembly according to claim 4, further comprising pump means driven by the drive assembly to provide the said hydraulic pressure.

10. A roller drive assembly comprising a plurality of angularly spaced tapered rollers, a plurality of relatively rotatable members having mutually inclined engagement surfaces each engageable by all the rollers of the said plurality of tapered rollers, said tapered rollers transmitting torque between said relatively rotatable members, and a fixed reaction member including means for supporting for rotation and axial movement all the rollers of the said plurality and including means for communicating hydraulic pressure in common to each roller to urge the rollers in respective axial directions into engagement with the said surfaces of the said relatively rotatable members.

11. An assembly according to claim 10, further comprising a fixed reaction member supporting said tapered rollers and thrust bearing means on said reaction member for supporting each respective roller against axial loading in the absence of the said pressure.

12. An assembly according to claim 10 in which the means for communicating hydraulic pressure comprises, for each roller in said set, an annular cylinder having movable as a piston therein a portion of the respective roller.

13. An assembly according to claim 12 in which the cylinder for one roller in said set includes means for limiting the axial movement caused by the said hydraulic pressure.

14. An assembly according to claim 13 in which the means for limiting comprises a pressure relief port openable by means of a predetermined movement of the said portion of the said one roller.

15. A roller drive assembly according to claim 10, further comprising pump means driven by the drive assembly to provide the said hydraulic pressure.

16. A roller drive assembly comprising: a first bevelled central roller; a bevelled annulus coaxial with the central roller; a set of bevelled rollers each engaging the central roller and the annulus, the generatrices of the engagement surfaces of the rollers and the respective engagement surface of the annulus intersecting at a common point on the axis of the central roller; a second bevelled central roller; a rotary member common to the first and second central rollers; a second set of rollers, the second central roller being coupled to a respective bevelled drive surface of the annulus by means of the second set of rollers, the generatrices of the engagement surfaces of the second central roller and the rollers of the second set intersecting at a second point on said common axis, the bevelling of the respective sets of rollers being in opposite directions; and means for communicating hydraulic pressure in common to each roller in a respective set of rollers to urge the rollers in respective axial directions into engagement with the engagement surfaces of the central roller and the annulus, the means for communicating hydraulic pressure comprising, for each roller in said respective set, an annular cylinder having movable as a piston therein a portion of the respective roller, the cylinder for one roller in said respective set including means for limiting the axial movement caused by the said hydraulic pressure, and the means for limiting comprising a pressure relief port openable by means of a predetermined movement of the said portion of the said one roller.

17. A roller drive assembly which includes at least one set of angularly spaced tapered rollers for the transmission of torque between relatively rotatable members having mutually inclined engagement surfaces each engageable by all the rollers of the said set and means for communicating hydraulic pressure in common to each roller to urge the rollers in respective axial directions into engagement with the said surfaces, the means for communicating hydraulic pressure comprising, for each roller in said set, an annular cylinder having movable as a piston a portion of the respective roller, the cylinder for one roller in said set including means for limiting the axial movement caused by the said hydraulic pressure, and the means for limiting comprising a pressure relief port openable by means of a predetermined movement of the said portion of the said one roller.

* * * * *

UNITED STATES PATENT AND TRADEMARK OFFICE
CERTIFICATE OF CORRECTION

PATENT NO. : 4,747,324
DATED : May 31, 1988
INVENTOR(S) : Forbes G. D. PERRY

It is certified that error appears in the above-identified patent and that said Letters Patent is hereby corrected as shown below:

FACE OF THE PATENT

In the "Abstract", line 8, change "Hydraulic conduits (47, 49, 54) are" to --A fixed reaction member (42) is--.

Column 2, line 62, change "by" to --but--.

Signed and Sealed this

Seventh Day of February, 1989

Attest:

DONALD J. QUIGG

Attesting Officer

Commissioner of Patents and Trademarks